US012808252B2

(12) United States Patent
Winkelmann et al.

(10) Patent No.: US 12,808,252 B2
(45) **Date of Patent: *Nov. 24, 2026**

(54) DOOR ACTUATOR FOR A DOOR SYSTEM AND METHOD FOR OPERATING THE SAME

(71) Applicant: dormakaba Deutschland GmbH, Ennepetal (DE)

(72) Inventors: Patrick Winkelmann, Ennepetal (DE); Alexey Kurkov, Ennepetal (DE); Dennis Meiering, Ennepetal (DE); Jonas Kirschner, Ennepetal (DE)

(73) Assignee: DORMAKABA DEUTSCHLAND GMBH, Ennepetal (DE)

( * ) Notice: Subject to any disclaimer, the term of this patent is extended or adjusted under 35 U.S.C. 154(b) by 480 days.

This patent is subject to a terminal disclaimer.

(21) Appl. No.: 18/446,220

(22) Filed: Aug. 8, 2023

(65) Prior Publication Data

US 2024/0052685 A1 Feb. 15, 2024

(30) Foreign Application Priority Data

Aug. 12, 2022 (EP) .................................... 22190248

(51) Int. Cl.
*E05F 15/73* (2015.01)

(52) U.S. Cl.
CPC .......... *E05F 15/73* (2015.01); *E05Y 2400/45* (2013.01); *E05Y 2900/132* (2013.01)

(58) Field of Classification Search
CPC . E05F 15/73; E05Y 2400/45; E05T 2900/132
USPC .......................................................... 700/275
See application file for complete search history.

(56) References Cited

U.S. PATENT DOCUMENTS

| | | | | |
|---|---|---|---|---|
| 4,565,029 | A | 1/1986 | Kornbrekke et al. | |
| 8,875,441 | B2 | 11/2014 | Agam et al. | |
| 2001/0030689 | A1 | 10/2001 | Spinelli | |
| 2013/0259306 | A1* | 10/2013 | Lee ......................... | E05F 15/74 382/106 |
| 2013/0263511 | A1* | 10/2013 | Agam ..................... | E05F 15/73 49/31 |
| 2019/0360256 | A1* | 11/2019 | Sasaki ..................... | E05F 15/73 |
| 2021/0065489 | A1* | 3/2021 | Hass ....................... | G06F 3/167 |

(Continued)

FOREIGN PATENT DOCUMENTS

| | | | |
|---|---|---|---|
| DE | 19613178 | A1 | 10/1997 |
| EP | 1655434 | B1 | 4/2015 |
| EP | 3613933 | A1 | 2/2020 |

*Primary Examiner* — Md Azad
(74) *Attorney, Agent, or Firm* — CANTOR COLBURN LLP

(57) ABSTRACT

A door actuator for a door system with at least one door leaf, with a sensor unit is configured and connected to a control unit of the door system, with the approach of at least one object to the door system within a detection region being detectable by the sensor unit, with the control unit configured to provide to the sensor unit deactivation data for deactivating the detection of the at least one object in at least one defined partial region of the detection region and/or to hide, delete and/or filter out object data, detected by the sensor unit, of at least one detected object in a defined partial region of the detection region. A door system for carrying out such a method and a computer program product are also related.

14 Claims, 6 Drawing Sheets

(56) References Cited

U.S. PATENT DOCUMENTS

| | | | | |
|---|---|---|---|---|
| 2022/0178188 | A1* | 6/2022 | Dreyer .................... | E05F 15/43 |
| 2022/0298845 | A1* | 9/2022 | Soderqvist .............. | E05F 15/63 |
| 2023/0193685 | A1* | 6/2023 | Hauri ...................... | E05F 15/73 49/31 |

* cited by examiner

DOOR ACTUATOR FOR A DOOR SYSTEM AND METHOD FOR OPERATING THE SAME

CROSS-REFERENCE TO RELATED APPLICATIONS

This application claims the benefit of European patent application 22190248.9, filed on 12 Aug. 2022, the disclosure of which is incorporated herein by reference in its entirety.

TECHNICAL FIELD

The disclosure relates to a door actuator for a door system with at least one door leaf, with a sensor unit being configured and connected to a control unit of the door system, with the approach of at least one object to the door system within a detection region being detectable by means of the sensor unit. Furthermore, the disclosure is aimed at a door system and at a method for controlling a door actuator of a door system as well as at a computer program product.

BACKGROUND

EP 3 613 933 A1 discloses, for example, a method for operating an automatic door system which has a door actuator connected to a door leaf. It is indicated here that radar movement detectors are used to actuate the door movement for automatic sliding doors. For swing leaf doors, radar sensors are not common for detecting monitored regions if the sensors ultimately detect objects, in particular in the form of people, and transmit corresponding data to a control unit to control the door system.

DE 196 13 178 A1 discloses a method for operating an automatic door system, and the door system can have a door leaf that can be operated via a door actuator. Furthermore, sensor units are proposed which cooperate with a control unit and the control unit can be actuated using sensor data such that the door system is optimally operated. However, self-detection of the movement of the door leaf cannot be effectively avoided in this way.

SUMMARY

The disclosure therefore further improves a door actuator for a door system and a method for operating a door system, in which self-detection of the door leaf is avoided in an effective manner. In particular, this should prevent malfunctions in the operation of the door system.

This is achieved by proceeding from a door actuator for a door system, proceeding from a door system, and proceeding from a method for controlling a door actuator of a door system, further proceeding from a computer program product according to the claims with the respectively characterizing features. Advantageous further developments of the disclosure are each indicated in the dependent claims.

According to the disclosure, the control unit is designed to provide to the sensor unit the activation data for deactivating the detection of the at least one object in at least one defined partial region of the detection region and/or to hide, delete and/or filter out object data, detected by means of the sensor unit, of at least one detected object in a defined partial region of the detection region.

As a result, partial regions within the detection region or edge regions of the detection region can be actively excluded by the control unit. It is thus possible for the defined partial regions to be actively hidden or not initiated solely by the sensor unit or at least not actively by the sensor unit. The partial regions can be deactivated by the control unit either by sending deactivation data to the sensor unit, or the sensor unit captures the entire detection region, with the defined partial regions of the detection region being filtered out, deleted and/or hidden by means of the controller without further interaction with the sensor unit. The control unit can thus be programmed directly with the defined partial regions, be designed to be self-learning and/or designed to recognize them with an artificial intelligence. Thus, the configuration of defined partial regions within which the control unit does not activate or does not deactivate the door actuator can be carried out exclusively or at least partially or preferably substantially with the control unit itself.

The active hiding of defined partial regions of the detection region takes place in particular during the door leaf movement. If the door leaf is fixed, this is preferably not done. The activation of the hiding, i.e. the generation and output of the activation data for deactivating the detection of the at least one object in at least one defined partial region or the hiding, deleting and/or filtering out by means of the sensor unit, can take place at the start of the door leaf movement and stop at the end of the door leaf movement.

In particular, the sensor unit can be integrated into the control unit and thus into the door actuator, which can also be referred to or understood as a door drive. The control unit can thus issue commands to the sensor unit, so that comprehensive data can be sent from the control unit to the sensor unit as a result of the system integration, for example physically by means of a CAN bus connection. In the same way, comprehensive data can be transmitted from the sensor unit to the control unit, in particular raw data, without being pre-filtered or pre-processed by the sensor unit. As a result, certain detection regions, which form the defined partial regions and which should not influence the movement of the door leaf, can be hidden more simply and quickly. It is thus possible for the determination and calculation of the defined partial regions, such as in particular the entire computer-numerical processing of the raw data of the sensor unit, to be carried out only by the control unit. Meanwhile, the sensor unit can only, for example, capture pixels with the detection element of the sensor unit and send them as raw data to the control unit.

The door actuator can have a corresponding drive, for example a motor. Furthermore, the door actuator can comprise a gear unit.

The door actuator or the drive unit connected thereto can be arranged, for example, on a building wall, on a door frame or on the door leaf itself, with the door actuator being moved along with the door leaf when the door actuator is arranged on the door leaf itself, for example if it is arranged on a revolving door leaf, which the door actuator moves relative to the door frame by means of a lifting device, preferably via a slide rail. The sensor unit can thereby be arranged stationary, in particular above the door leaf or to the side of the door leaf, and if the door actuator and thus the control unit know the current position of the door leaf, in particular via a rotary encoder, the defined partial region, in which no activation of the door leaf is to take place, can be actively hidden during the operation of the door actuator, which is done by means of a corresponding, constantly running numerical calculation, but without the sensor unit being moved along with the door leaf.

In particular, the door actuator has a computer unit for processing the object data, with the computer unit being designed as part of the sensor unit or as part of the control unit. In particular when the sensor unit is integrated in the control unit, in particular at least the electronic components of the sensor unit, the computer unit can also be integrated in the control unit. The sensor unit can thereby have a detection element, for example a radar head, a radar antenna or the like, and the associated electronic component can already be part of the control unit, in this regard the computer unit can also preferably be part of the control unit.

Further advantageously, the defined partial region comprises the movement region of the at least one door leaf or the defined partial region is limited to the movement region of the at least one door leaf. The movement region can be limited by the pivoting movement of a rotary leaf, such that, for example, the movement region approximately has the shape of a quadrant of a full circle or, with a correspondingly larger opening width of the door leaf, for example the shape of a semicircle, with linearly movable door leaves being provided for sliding door systems such that the movement region forms an approximately bar-shaped, straight region in front of the door system. The defined partial regions can be configured within these movement regions by means of the control unit.

By deactivating certain regions within the detection region in front of the door system, self-activation of the door actuator through the detection of the door leaf itself is avoided. This device is in particular advantageous when the sensor unit is arranged stationary on the wall, on a stationary part of the door system, in particular on the door frame, such that the sensor unit is not moved along with the movement of the door leaf. If the control unit is programmed accordingly with a software program product, such that the deactivation data for deactivating the detection of the object in the defined partial region takes place, or the sensor unit filters out corresponding defined partial regions from the data supplied by the sensor unit, self-detection of the door actuator can then also be avoided if the sensor unit is not moved along with the movement of the door leaf.

Within the scope of the disclosure, the defined partial region can also comprise a movement region of an external element. For example, with industrially used door systems, movements can also take place within the detection region of the door system, for example by means of industrial trucks, recurrently moving machine parts, cranes or the like, whose movement within the detection region should not activate the door actuator.

In particular, the sensor unit is designed and configured to only capture object data from moving objects or to provide it to the control unit. Within the meaning of the disclosure, the sensor unit can also be designed to define both static partial regions within which detection is deactivated and/or the defined partial regions within the detection region are dynamic and can therefore be changed locally. In this way, moving objects can also form defined moving partial regions that trigger a deactivation of the detection, in particular if the moving objects within the detection region are known and can consequently be programmed into the control unit beforehand. It is therefore conceivable to define a first static partial region and to define a second dynamic partial region. A particularly advantageous deactivation could thus take place.

The defined partial region can thus be designed to be static, and the defined partial region can thus correspond in particular to the complete movement region of the at least one door leaf. It is also possible for the defined partial region to increase or decrease in its two-dimensional extension within the detection region as the door leaf moves. If, for example, the defined partial region is defined in front of the door leaf in the movement direction, the defined partial region becomes smaller during the closing movement of the door leaf and can increase again when the door leaf is opened.

This creates a certain data efficiency, because as soon as the door leaf is in any open position, the entire possible door travel region is hidden such that self-activation is avoided. The self-activation thereby defines an actuation of the door leaf based on sensor data that are defined by the door leaf itself. Additional safety sensors are preferably configured to protect closing edges, in particular to protect the main closing edges and/or the secondary closing edges. In this way, security can be created despite the hiding process. If one of the sensor units takes effect, there is no further opening and/or closing of the door leaf and the door leaf can also reverse if necessary.

Further advantageously, the defined partial region is designed to be dynamic as an alternative or as a further partial region in addition, such that it can change in a time-varying manner in relation to its size and/or position within the detection region. This means that the defined partial region is time-varying in relation to its size and position. This achieves greater security, because only the part of the detection region that is actually supposed to be hidden is hidden in order to avoid self-activation. The remaining detection region thereby remains active and can reliably influence the movement of the door leaf, in particular when an object is detected.

In particular, the control unit can be designed and configured in such manner that the position of the at least one door leaf is determined in order to dynamically adapt the defined partial region to the position of the door leaf, for example by means of an angle sensor within the door actuator. On the one hand, there is the possibility that the position is transmitted to the sensor unit such that the sensor unit receives information about the current position of the door leaf and correspondingly hides the defined partial region. This can be done, for example, with the computer unit for processing the object data, with it being possible for the computer unit to be part of the sensor unit or part of the control unit. As a result, the sensor unit calculates the defined partial region for deactivating the detection of the objects itself. Alternatively, the defined partial region can be calculated in the control unit, in particular in the computer unit, as part of the control unit, and the result is provided to the sensor unit. Lastly, there is also the possibility that the defined partial region is calculated in the control unit, in particular in the computer unit, and the object data from this defined partial region are actively filtered out, deleted and/or hidden by means of the control unit.

Even further advantageously, the control unit is designed and configured to determine the travel direction of the at least one door leaf in order to dynamically adapt the defined partial region, in particular if it is moving in the closing direction and the defined partial region is within the door leaf inner region and/or it is provided that the defined partial region is in the opening direction of the door leaf such that it lies in the door leaf outer region.

The door actuator can be designed to open a further door leaf, with the defined partial region comprising the movement region of the further door leaf or being formed thereby. For example, the door system can be designed with two leaves, or two door systems are configured one behind the other in one direction of entering such that the respective door leaf of the door systems can be moved into the detection region of the adjacent door system. With the device according to the disclosure for hiding certain partial regions, the two door systems therefore do not have to be actuated with a common controller.

If the door system has a plurality of door leaves, a plurality of door actuators can also be configured in or on the door system depending on the number of door leaves, with a plurality of door leaves also being able to be actuated with just one door actuator. If there are a plurality of door leaves, further travel regions can be programmed to correspondingly hide the activation of objects. The defined partial region of the detection region to be hidden is particularly advantageously formed on a hinge side of the at least one door leaf, since the problem of self-activation of the door leaf to trigger the sensor unit is particularly great in this region. Thus, the door leaf of the door system can be designed as a rotary leaf and perform a pivoting movement, with the pivoting region forming the defined partial region in particular. The hinge side is understood to be the region behind or in front of the door leaf, which is located facing the side of the door leaf on which the door leaf is hung, in particular by means of a door hinge or door hinges.

The disclosure is also aimed at a door system with a door actuator as described above.

The disclosure is also aimed at a method for controlling a door actuator of a door system as described above, with the method providing at least the following steps: Generating deactivation data for deactivating the detection of the at least one object in at least one defined partial region of the detection region by means of the control unit and transmitting it to the sensor unit and/or hiding, deleting and/or filtering out detected object data of at least one detected object in a defined partial region of the detection region of the sensor unit by means of the control unit. The additional features and associated advantages described in connection with the door actuator also apply to the method according to the disclosure.

Lastly, the disclosure is also aimed at a computer program product for forming a door actuator as described above, in particular for programming a control unit of a door actuator.

BRIEF DESCRIPTION OF THE DRAWINGS

Further measures that improve the disclosure will be outlined in greater detail below together with the description of a preferred exemplary embodiment of the disclosure on the basis of the figures, in which is shown.

DETAILED DESCRIPTION OF THE DRAWINGS

Figure 1:
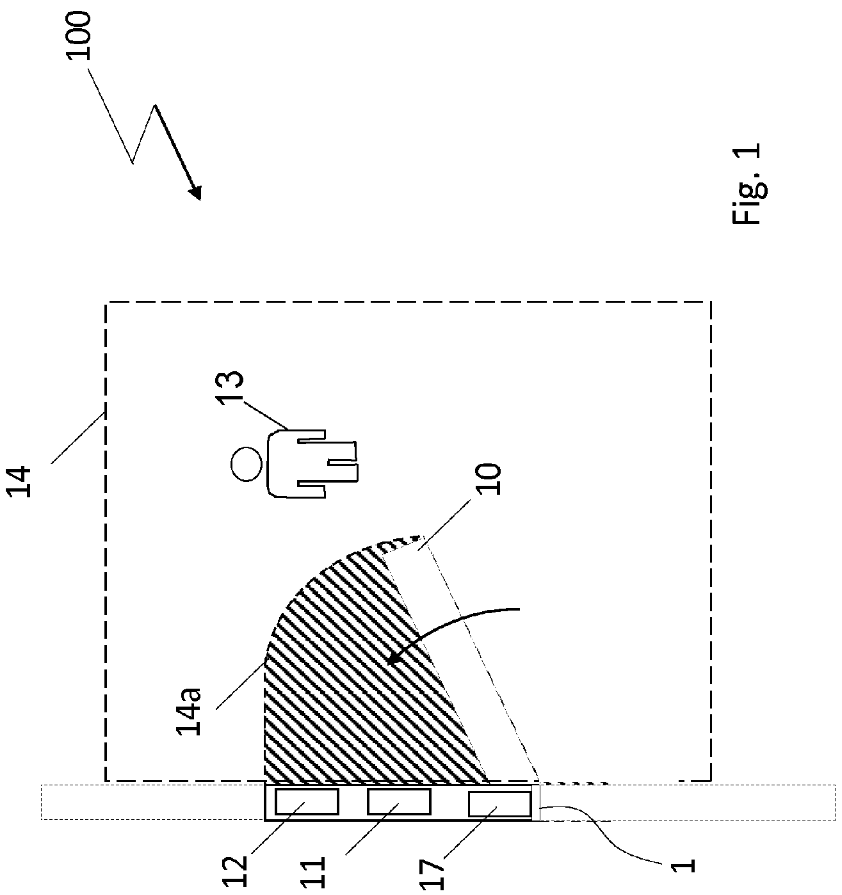
FIG. 1 the door system with a door actuator and a movable door leaf in a wide open position, FIG. 2 the door system with a door actuator and a movable door leaf in a slightly open position, FIG. 3*a* the door system with a door actuator and a movable door leaf in a wide open position; with a defined partial region being formed migrating around the door leaf, FIG. 3*b* the door system with a door actuator and a movable door leaf in a slightly open position, with the defined partial region migrating around the door leaf along with the movement of the door leaf, FIG. 4*a* the door system with a door actuator and a movable door leaf in a slightly open position; with a defined partial region being formed behind the opening door leaf, FIG. 4*b* the door system with a door actuator and a movable door leaf in a wide open position, with a defined partial region behind the open door leaf being formed smaller than in the slightly open position, FIG. 5 the door system with a door actuator and a movable door leaf, with a defined partial region in the movement field of the door leaf being designed to be static and therefore stationary, FIG. 6*a* the door system with a door actuator and a door leaf designed as a sliding door in an open position, and FIG. 6*b* the door system with a door actuator and a door leaf designed as a sliding door in a closed position.

FIG. 1 shows the door system 100 with a door actuator 1 and a movable door leaf 10, designed as a rotary leaf, which is operatively connected to the door actuator 1 via a drive 17 and can be pivoted with the same. The door system 100 also has a sensor unit 11, which is connected to a control device 12; with the control device 12 for example being part of the door actuator 1 or being designed so as to form a structural unit with the same.

The sensor unit 11 spans a detection region 14 in front of the door system 100, and partial regions 14*a* can be defined within the detection region 14. The partial regions 14*a* are formed or delimited by means of the control unit 12 and in particular in operative connection with the sensor unit 11, with the control unit 12 also being designed to evaluate the behavior when detecting objects in the defined partial region 14*a* differently from the rest of the detection region 14 and to design the control behavior of the door leaf 10 by means of the door actuator 1 differently when an object 13 is detected in the defined partial region 14*a*.

For this purpose, the controller 12 is designed to provide to sensor unit 11 the deactivation data for deactivating the detection of the object 13 in at least one defined partial region 14*a* of detection region 14 shown, and/or the control unit 12 is designed to hide, delete and/or filter out object data, detected by means of sensor unit 11, of at least one detected object 13 in a defined partial region 14*a* of the detection region 14.

The exemplary embodiment according to FIG. 1 shows the region of the pivoting movement of the door leaf 10 from the illustrated position into a closed position. If the detection region 14 were to be completely monitored, the pivoting movement of the door leaf 10 would cause self-detection, since the sensor unit 11 is installed stationarily on or in the door actuator 1. The sensor unit 11 can also be installed at a location remote from the door actuator 1, but the sensor unit 11 does not move along with the door leaf 10 itself, i.e. it is not arranged on the door leaf itself. The disclosure makes it possible to prevent self-detection of the door leaf 10 even when the sensor unit 11 is installed stationarily, whereas the detection of the object 13 within the detection region 14 is possible without restrictions.

In order to prevent an object 13 from colliding within the defined partial region 14*a*, the previous approach of the object 13; e.g. a person, can be stored in the control unit 12 such that the presence of the object 13 within the defined partial region 14*a* is stored in the control unit 12. Then, of course, an interruption of the movement of the door leaf 10 can also be triggered within the partial region 14*a* such that the deactivation does not take effect in this case.

Figure 2:
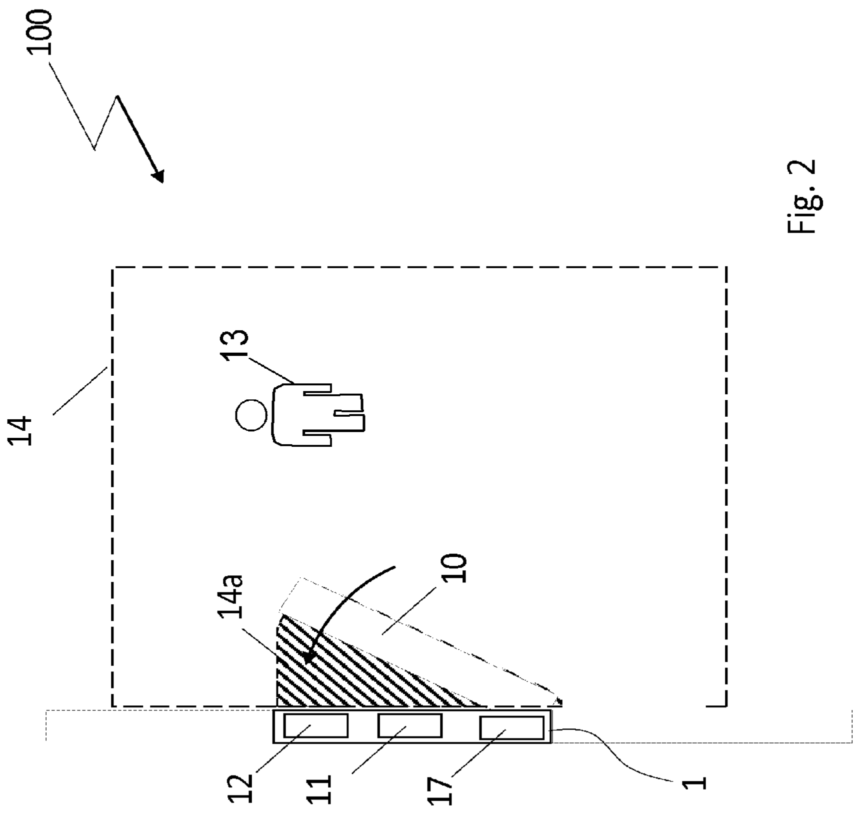

FIG. 2 shows the progressive reduction in size of the defined partial region 14*a* within the detection region 14 when, as shown, the door leaf 10 is closed further compared to FIG. 1. If the door actuator 1 closes the door leaf 10 in the direction of the closed position by means of the drive 17, according to the disclosure, the defined partial region 14*a* is continuously calculated by means of the control unit 12 as the movement of the door leaf 10 progresses such that over the entire pivoting movement of the door leaf 10, self-detection of the door leaf 10 by means of the sensor unit 11 is prevented.

Figure 3B:
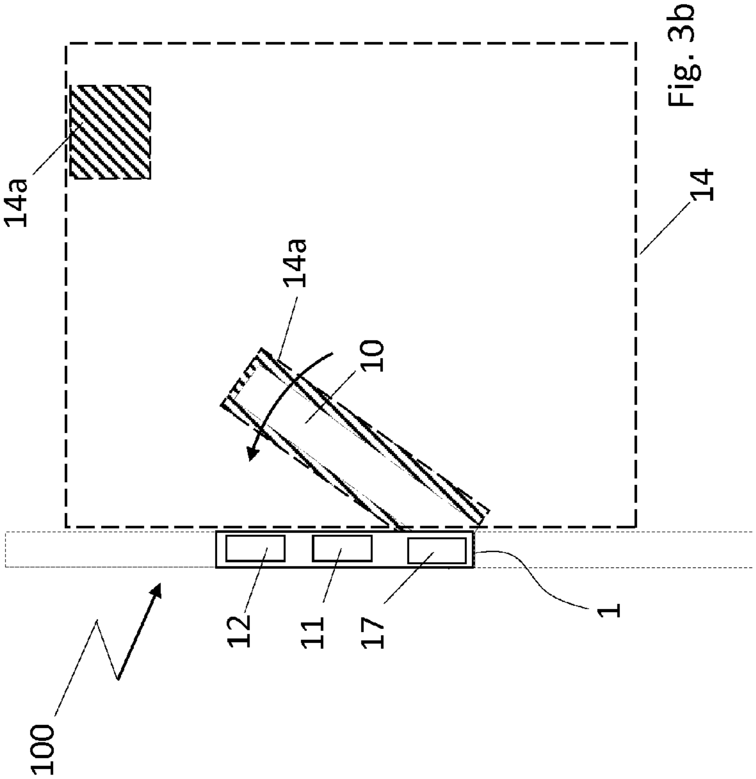
Figure 3A:
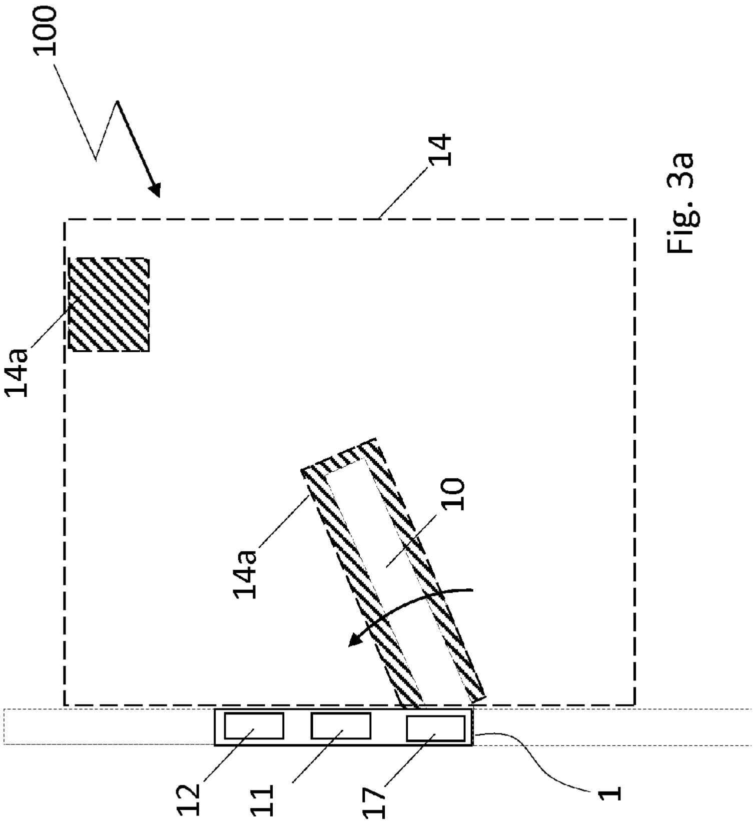

FIGS. 3*a* and 3*b* show the door system 100 with the door leaf 10, which can be moved by means of the door actuator 1 and the drive 17 present therein. The opening angle of the door leaf 10 is larger in FIG. 3*a* than the opening angle in FIG. 3*b*.

A first defined partial region 14*a* is defined around door leaf 10 by means of the control unit 12 and the sensor unit 11 with the spanned detection region 14, which is designed such that the defined partial region 14*a* forms a kind of covering of a so-called dead angle, and the defined partial region 14*a* around the door leaf 10 prevents the door leaf 10 being detected by the sensor unit 11 itself. Furthermore, a defined partial region 14*a* is shown independently of the door leaf 10, which makes it clear that the defined partial region 14*a* does not have to be designed to be dynamic, but the defined partial region 14*a* can also be defined to be static and thus stationary within the detection region 14.

Figure 4B:
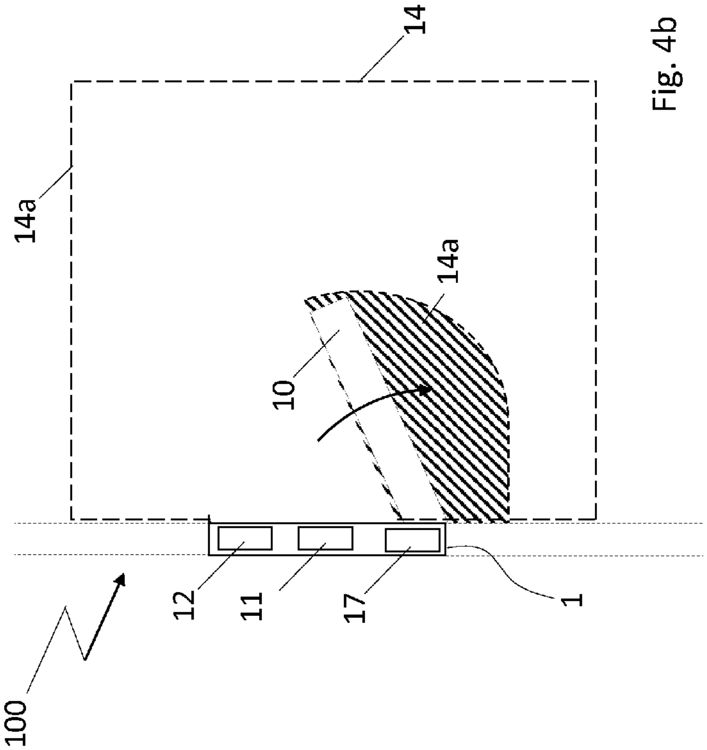
Figure 4A:
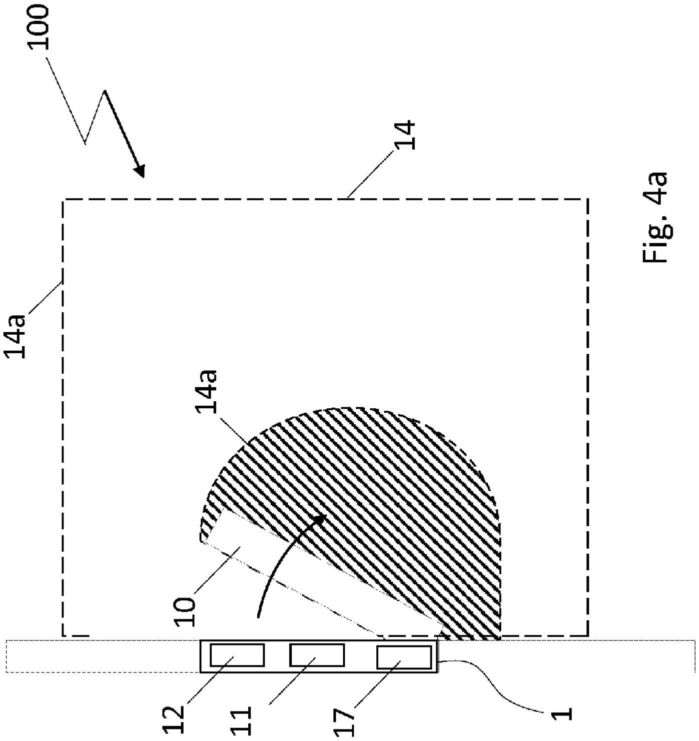

Analogously to FIGS. 1 and 2, FIGS. 4*a* and 4*b* show a door system 100 with a door actuator 1, having a sensor unit 11 and a control unit 12, with the door actuator 1 being able to move the door leaf 10. The comparison of the open position of the door leaf 10 in FIG. 4*a* with the open position in FIG. 4*b* shows an opening movement of the door leaf 10 within the detection region 14.

During an opening movement of a door leaf 10, the defined partial region 14*a* is placed behind the door leaf 10 such that the defined partial region 14*a* forms the region into which the door leaf 10 moves. As a result, self-detection of the door leaf 10 can also be prevented during an opening movement of the same.

Figure 5:
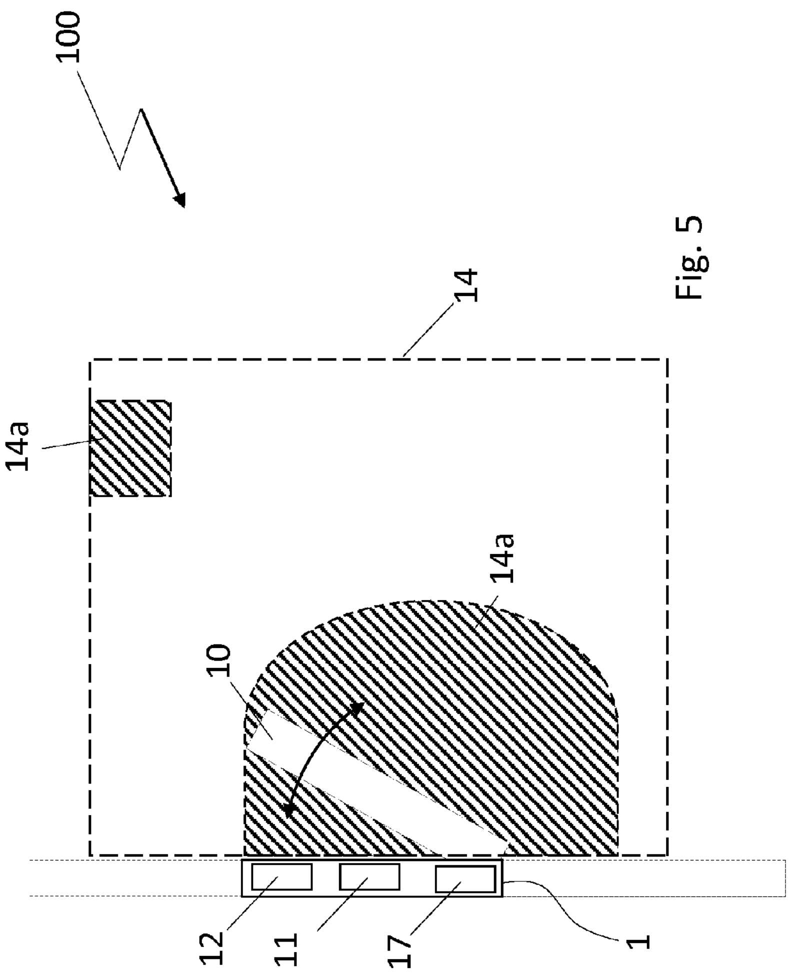

FIG. 5 shows that the pivoting region of the door leaf 10 can also be provided with a statically designed, defined partial region 14*a* within the detection region 14 such that the movement of the door leaf 10 by means of the drive 17 does not lead to self-detection by means of the sensor unit 11 in connection with the control unit 12 of the door actuator 1. It is also important here that it is stored in the control unit 12 whether an object 13 has already moved through the detection region 14 that is otherwise enabled for detection and into the defined partial region 14*a*. As well as the defined partial region 14*a* shown independently of the door leaf 10, the defined partial region 14*a*, which is intended to prevent the self-detection of the door leaf 10, can be designed to be static and thus stationary.

Figure 6B:
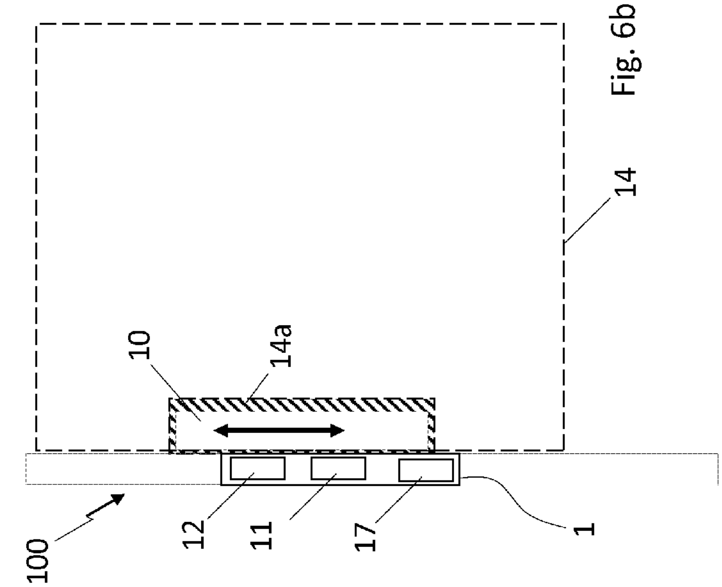
Figure 6A:
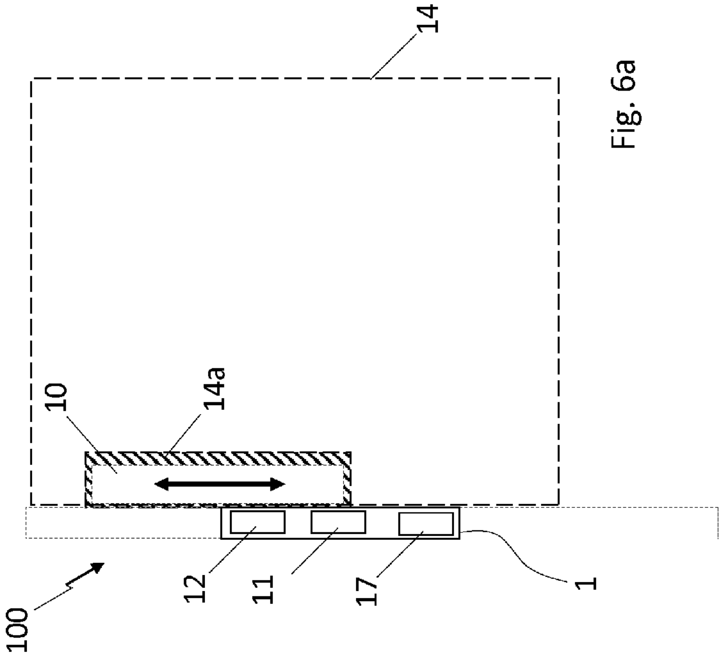

In contrast to the previous illustrations, FIGS. 6*a* and 6*b* show door systems 100 with a door leaf 10 which is designed as a sliding door. The position of the door leaf 10 is shown differently in FIGS. 6*a* and 6*b*, with the illustration making it clear that the defined partial region 14*a* can be moved along with the linear movement of the door leaf 10 such that the defined partial region 14*a* migrates within the detection region 14. If the door leaf 10 is thus moved by means of the drive 17 of the door actuator 1, the deactivation of the detection, for example of an object 13 within the detection region 14 in the partial region 14*a*, can be suppressed by means of the control unit 12 such that a corresponding detection with the sensor unit 11 is prevented or the sensor unit 11 does not transmit corresponding detection data to the control unit 12. The design of the door actuator 1 according to the disclosure and the associated method is applicable to door systems 100 with swing leaf doors as well as with sliding leaf doors.

The design of the disclosure is not restricted to the preferred exemplary embodiment indicated above. In fact, a number of variants is conceivable which make use of the represented solution even in the case of fundamentally different designs. All features and/or advantages emerging from the claims, the description or the drawings, including constructive details or spatial arrangements, may be essential to the disclosure by themselves and in the most varied combinations.

The invention claimed is:

1. A door actuator for a door system with at least one door leaf, wherein a sensor unit is configured and connected to a control unit of the door system, wherein the approach of at least one object to the door system within a detection region is detectable by the sensor unit, wherein the control unit is designed to:

provide to the sensor unit deactivation data for deactivating the detection of the at least one object in at least one defined partial region of the detection region or hide, delete or filter out object data, detected by the sensor unit, of at least one detected object in a defined partial region of the detection region, wherein the control unit is designed and configured to determine a position of the at least one door leaf in order to dynamically adapt the defined partial region to the position of the door leaf.

2. The door actuator according to claim 1, wherein a computer unit is configured for processing the object data, wherein the computer unit is designed as part of the sensor unit or as part of the control unit.

3. The door actuator according to claim 1, wherein the defined partial region comprises or is limited to a movement region of the at least one door leaf.

4. The door actuator according to claim 1, wherein the defined partial region comprises a movement region of an external element.

5. The door actuator according to claim 1, wherein the sensor unit is configured to capture only object data from moving objects or to provide object data to the control unit.

6. The door actuator according to claim 1, wherein the defined partial region is designed to be static, wherein the defined partial region corresponds to a complete movement region of the at least one door leaf.

7. The door actuator according to claim 1, wherein the defined partial region is designed to be dynamic such that the defined partial region is configured to change in relation to size or position within the detection region.

8. The door actuator according to claim 1, wherein the control unit is configured to determine the travel direction of the at least one door leaf in order to dynamically adapt the defined partial region, when the at least one door leaf moves in the closing direction, to place the partial region into the door leaf inner region or, when the at least one door leaf moves in the opening direction, to place the partial region into the door leaf outer region.

9. The door actuator according to claim 1, wherein the door actuator is designed to open a further door leaf and wherein the defined partial region comprises a movement region of the further door leaf or is formed thereby.

10. The door actuator according to claim 9, wherein the detection region is formed on a hinge side of the at least one door leaf.

11. The door actuator according to claim 1, wherein the at least one door leaf is designed as a rotary leaf and performs a pivoting movement, wherein the pivoting region forms the defined partial region.

12. A door system with a door actuator according to claim 1, comprising at least one door leaf, wherein the control unit is designed and configured to determine a position of the at least one door leaf in order to dynamically adapt the defined partial region to the position of the door leaf.

13. A method for controlling a door actuator of a door system according to claim 1, wherein the method includes at least the following steps:

generating deactivation data for deactivating the detection of the at least one object in at least one defined partial region of the detection region by the control unit and transmitting deactivation data to the sensor unit, or hiding, deleting or filtering out detected object data of at least one detected object in a defined partial region of the detection region of the sensor unit by the control unit, wherein the control unit is designed and configured to determine a position of the at least one door leaf in order to dynamically adapt the defined partial region to the position of the door leaf.

14. A computer program product for forming a door actuator according to claim 1 or for carrying out a method for controlling the door actuator, the method including at least the following steps:

generating deactivation data for deactivating the detection of the at least one object in at least one defined partial region of the detection region by the control unit and transmitting deactivation data to the sensor unit, or hiding, deleting or filtering out detected object data of at least one detected object in a defined partial region of the detection region of the sensor unit by the control unit or for implementation in the control unit or the sensor unit of the door actuator of the door system, comprising at least one door leaf, wherein the control unit is designed and configured to determine a position of the at least one door leaf in order to dynamically adapt the defined partial region to the position of the door leaf.

* * * * *